(12) United States Patent
Chi et al.

(10) Patent No.: US 9,890,717 B2
(45) Date of Patent: Feb. 13, 2018

(54) SYSTEM AND METHOD FOR ESTIMATING TURBOCHARGER OPERATING SPEED

(71) Applicant: Cummins Inc., Columbus, IN (US)

(72) Inventors: John N. Chi, Columbus, IN (US); John M. Mulloy, Columbus, IN (US); Sriram S. Popuri, Greenwood, IN (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 15/267,857

(22) Filed: Sep. 16, 2016

(65) Prior Publication Data

US 2017/0002752 A1 Jan. 5, 2017

Related U.S. Application Data

(63) Continuation of application No. 14/537,100, filed on Nov. 10, 2014, now Pat. No. 9,453,468, which is a
(Continued)

(51) Int. Cl.
| | |
|---|---|
| *F02D 23/00* | (2006.01) |
| *F02B 37/00* | (2006.01) |
| *F02D 28/00* | (2006.01) |
| *F02D 41/18* | (2006.01) |
| *F02D 41/00* | (2006.01) |
| *G01P 3/00* | (2006.01) |
| *G01F 1/00* | (2006.01) |
| *G01P 3/26* | (2006.01) |
| *F02B 29/04* | (2006.01) |
| *F02D 41/14* | (2006.01) |

(52) U.S. Cl.
CPC .............. *F02D 23/00* (2013.01); *F02B 37/00* (2013.01); *F02D 23/005* (2013.01); *F02D 28/00* (2013.01); *F02D 41/0007* (2013.01); *F02D 41/18* (2013.01); *G01F 1/00* (2013.01); *G01P 3/00* (2013.01); *G01P 3/26* (2013.01); *F02B 29/04* (2013.01); *F02D 2041/1433* (2013.01); *F02D 2200/0406* (2013.01); *F02D 2200/0414* (2013.01); *Y02T 10/144* (2013.01)

(58) Field of Classification Search
CPC ........ F02D 23/00; F02D 23/005; F02D 28/00; F02D 41/00; F02D 41/007; F02D 41/18; F02D 2041/1433; F02B 37/00; F02B 29/04; G01F 1/00; G01P 3/00; G01P 3/26; Y02T 10/144
See application file for complete search history.

(56) References Cited

U.S. PATENT DOCUMENTS

| 6,401,457 B1 | 6/2002 | Wang et al. |
| 6,804,601 B2 | 10/2004 | Wang et al. |

(Continued)

*Primary Examiner* — Hieu T Vo
(74) *Attorney, Agent, or Firm* — Faegre Baker Daniels LLP

(57) ABSTRACT

A system and method are provided for estimating the operating speed of a turbocharger. A first pressure value corresponds to pressure at or near the air inlet of the compressor, and a second pressure value corresponds to pressure at or near the air outlet of the compressor. A temperature value corresponds to a temperature at or near the air inlet of the compressor, and a flow rate value corresponds to a flow rate of air entering the air inlet of the compressor. The operating speed of the turbocharger is estimated as a function of the first pressure value, the second pressure value, the temperature value and the flow rate value.

20 Claims, 3 Drawing Sheets

Related U.S. Application Data continuation of application No. 13/244,540, filed on Sep. 25, 2011, now Pat. No. 8,892,332.

(56) References Cited

U.S. PATENT DOCUMENTS

| | | |
|---|---|---|
| 7,007,472 B2 | 3/2006 | Baize |
| 7,100,375 B2 | 9/2006 | Baize et al. |
| 8,205,503 B2 | 6/2012 | Cox |
| 8,567,192 B2 * | 10/2013 | Chi ..................... F02B 37/18 |
| | | 123/562 |
| 8,892,332 B2 | 11/2014 | Chi |
| 9,334,833 B2 * | 5/2016 | Kitsukawa ............ F02B 37/013 |
| 9,453,468 B2 * | 9/2016 | Chi ..................... F02D 28/00 |

* cited by examiner

US 9,890,717 B2

SYSTEM AND METHOD FOR ESTIMATING TURBOCHARGER OPERATING SPEED

CROSS REFERENCE TO RELATED APPLICATIONS

This application is a continuation of U.S. patent application Ser. No. 14/537,100 filed on Nov. 10, 2014, entitled "System and Method for Estimating Turbocharger Operating Speed", which is a continuation of U.S. patent application Ser. No. 13/244,540 filed on Sep. 25, 2011, now U.S. Pat. No. 8,892,332, entitled "System and Method for Estimating Turbocharger Operating Speed," owned by the instant assignee and hereby expressly incorporated herein by reference.

FIELD OF THE INVENTION

The present invention relates generally to turbochargers for internal combustion engines, and more specifically to systems and methods for estimating the operating speed of such turbochargers.

BACKGROUND

A turbocharger is conventionally used with an internal combustion engine to increase flow of air entering the engine under certain operating conditions. It is desirable to estimate the operating speed of such turbochargers using information provided by actual and/or virtual on-board sensors other than a turbocharger operating speed sensor.

SUMMARY

The present invention may comprise one or more of the features recited in the claims appended hereto, and/or one or more of the following features and combinations thereof. A system for estimating an operating speed of a turbocharger including a compressor having an air inlet and an air outlet may comprise a first pressure sensor configured to produce a first pressure signal indicative of pressure at or near the air inlet of the compressor, a second pressure sensor configured to produce a second pressure signal indicative of pressure at or near the air outlet of the compressor, a temperature sensor configured to produce a temperature signal indicative of temperature at or near the air inlet of the compressor, a flow sensor configured to produce a flow signal indicative of a flow rate of air into the air inlet of the compressor, and a control circuit. The control circuit may include a memory having instructions stored therein that are executable by the control circuit to estimate the operating speed of the turbocharger as a function of the first and second pressure signals, the temperature signal and the flow signal.

The memory may have stored therein a map of compressor pressure ratio values as a function of air inlet flow rate values at a plurality of different turbocharger operating speeds. The instructions stored in the memory may further include instructions that are executable by the control circuit to process the flow signal using the map to generate a number of pairs of turbocharger operating speed and compressor pressure ratio values. The instructions stored in the memory may further include instructions that are executable by the control circuit to determine a compressor-corrected flow rate value as a function of the flow signal, the temperature signal and the first pressure signal. The map may be stored in the memory as a map of compressor pressure ratio values as a function of compressor-corrected flow rate values at the plurality of different turbocharger operating speeds. The instructions stored in the memory may further include instructions that are executable by the control circuit to determine a current compressor pressure ratio value as a function of the first and second pressure values, and to process the current compressor pressure ratio value along with a function of at least two of the number of pairs of turbocharger operating speed and compressor pressure ratio values to estimate the operating speed of the turbocharger. The estimated operating speed of the turbocharger may represent a compressor-corrected turbocharger operating speed, and the instructions stored in the memory may further include instructions that are executable by the control circuit to estimate the operating speed of the turbocharger as a function of the compressor-corrected operating speed of the turbocharger and the temperature signal.

The instructions stored in the memory may further include instructions that are executable by the control circuit to determine a current compressor pressure ratio as a function of the first and second pressure signals, to process the flow signal using a compressor pressure ratio map to generate a number of pairs of turbocharger operating speed and compressor pressure ratio values, and to estimate the operating speed of the turbocharger using the current compressor pressure ratio value and a function of at least two of the number of pairs of turbocharger operating speed and compressor pressure ratio values. The estimated operating speed of the turbocharger may represent a compressor-corrected turbocharger operating speed, and the instructions stored in the memory may further include instructions that are executable by the control circuit to estimate the operating speed of the turbocharger as a function of the compressor-corrected turbocharger operating speed and the temperature signal.

The control circuit may be configured to control operation of an internal combustion engine operatively coupled to the turbocharger.

A system for estimating an operating speed of a turbocharger including a compressor having an air inlet and an air outlet may comprise a first pressure sensor configured to produce a first pressure signal indicative of pressure at or near the air inlet of the compressor, a second pressure sensor configured to produce a second pressure signal indicative of pressure at or near the air outlet of the compressor, a flow sensor configured to produce a flow signal indicative of a flow rate of air into the air inlet of the compressor, and a control circuit. The control circuit may include a memory having instructions stored therein that are executable by the control circuit to process the flow signal using a compressor pressure ratio map to generate a number of pairs of turbocharger operating speed and compressor pressure ratio values, to determine a current compressor pressure ratio value as a function of the first and second pressure signals, and to estimate the operating speed of the turbocharger using the current compressor pressure ratio value and a function of at least two of the number of pairs of the turbocharger operating speed and compressor pressure ratio values.

The system may further comprise a temperature sensor configured to produce a temperature signal indicative of temperature at or near the air inlet of the compressor, and the instructions stored in the memory may further include instructions that are executable by the control circuit to determine a compressor-corrected flow value as a function of the flow signal, the first pressure signal and the temperature signal. The instructions stored in the memory may further include instructions that are executable by the control circuit to process the compressor-corrected flow value using the compressor pressure ratio map to generate the number of pairs of turbocharger operating speed and compressor pressure ratio values. The compressor pressure ratio map may be stored in the memory and may be configured to map air inlet flow rate values to compressor pressure ratio values at a plurality of different turbocharger operating speeds. The instructions stored in the memory may further include instructions that are executable by the control circuit to generate the number of pairs of turbocharger operating speed and compressor pressure ratio values by processing the compressor-corrected flow value using the compressor pressure ratio map.

The system may further comprise a temperature sensor configured to produce a temperature signal indicative of temperature at or near the air inlet of the compressor. The estimated operating speed of the turbocharger may represent a compressor-corrected turbocharger operating speed, and the instructions stored in the memory may further include instructions that are executable by the control circuit to estimate the turbocharger operating speed value as a function of the compressor-corrected turbocharger operating speed and the temperature signal.

The compressor pressure ratio map may be stored in the memory and may be configured to map air inlet flow rate values to compressor pressure ratio values at a plurality of different turbocharger operating speeds. The instructions stored in the memory may further include instructions that are executable by the control circuit to generate the number of pairs of turbocharger operating speed and compressor pressure ratio values by processing the flow signal using the compressor pressure ratio map.

The control circuit may be configured to control operation of an internal combustion engine operatively coupled to the turbocharger.

A method of estimating an operating speed of a turbocharger including a compressor having an air inlet and an air outlet may comprise determining a first pressure value corresponding to pressure at or near the air inlet of the compressor, determining a second pressure value corresponding to pressure at or near the air outlet of the compressor, determining a temperature value corresponding to a temperature at or near the air inlet of the compressor, determining a flow rate value corresponding to a flow rate of air entering the air inlet of the compressor, and estimating the operating speed of the turbocharger as a function of the first pressure value, the second pressure value, the temperature value and the flow rate value.

Estimating the operating speed of the turbocharger may comprise determining a current compressor pressure ratio as a function of the first and second pressure values, processing the flow rate value using a compressor pressure ratio map to generate a number of pairs of turbocharger operating speed and compressor pressure ratio values, the compressor pressure ratio map configured to map compressor air inlet flow rate values to compressor pressure ratio values at a plurality of different turbocharger operating speeds, and processing the current compressor pressure ratio value along with a function of at least two of the number of pairs of turbocharger operating speed and compressor pressure ratio values to estimate the operating speed of the turbocharger. Processing the flow rate value using a compressor pressure ratio map to generate the number of pairs of turbocharger operating speed and compressor pressure ratio values may comprises determining a compressor-corrected flow rate value as a function of the flow rate value, the first pressure value and the temperature value, and processing the compressor-corrected flow rate value using the compressor pressure ratio map to generate the number of pairs of turbocharger operating speed and compressor pressure ratio values. The estimated operating speed of the turbocharger may represent a compressor-corrected turbocharger operating speed, and the method may further comprise determining the operating speed of the turbocharger as a function of the compressor-corrected operating speed of the turbocharger and the temperature value.

The method may further comprise using a control circuit configured to control operation of an internal combustion engine to which the turbocharger is operatively coupled to execute all of the determining steps and the estimating step.

The method may further comprise determining the first pressure by processing a first pressure signal produced by a first pressure sensor positioned at or near the air inlet of the compressor, determining the second pressure by processing a second pressure signal produced by a second pressure sensor positioned at or near the air outlet of the compressor, determining the flow rate value by processing a flow rate signal produced by a flow rate sensor positioned at or near the air inlet of the compressor, and determining the temperature value by processing a temperature signal produced by a temperature sensor positioned at or near the air inlet of the compressor.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
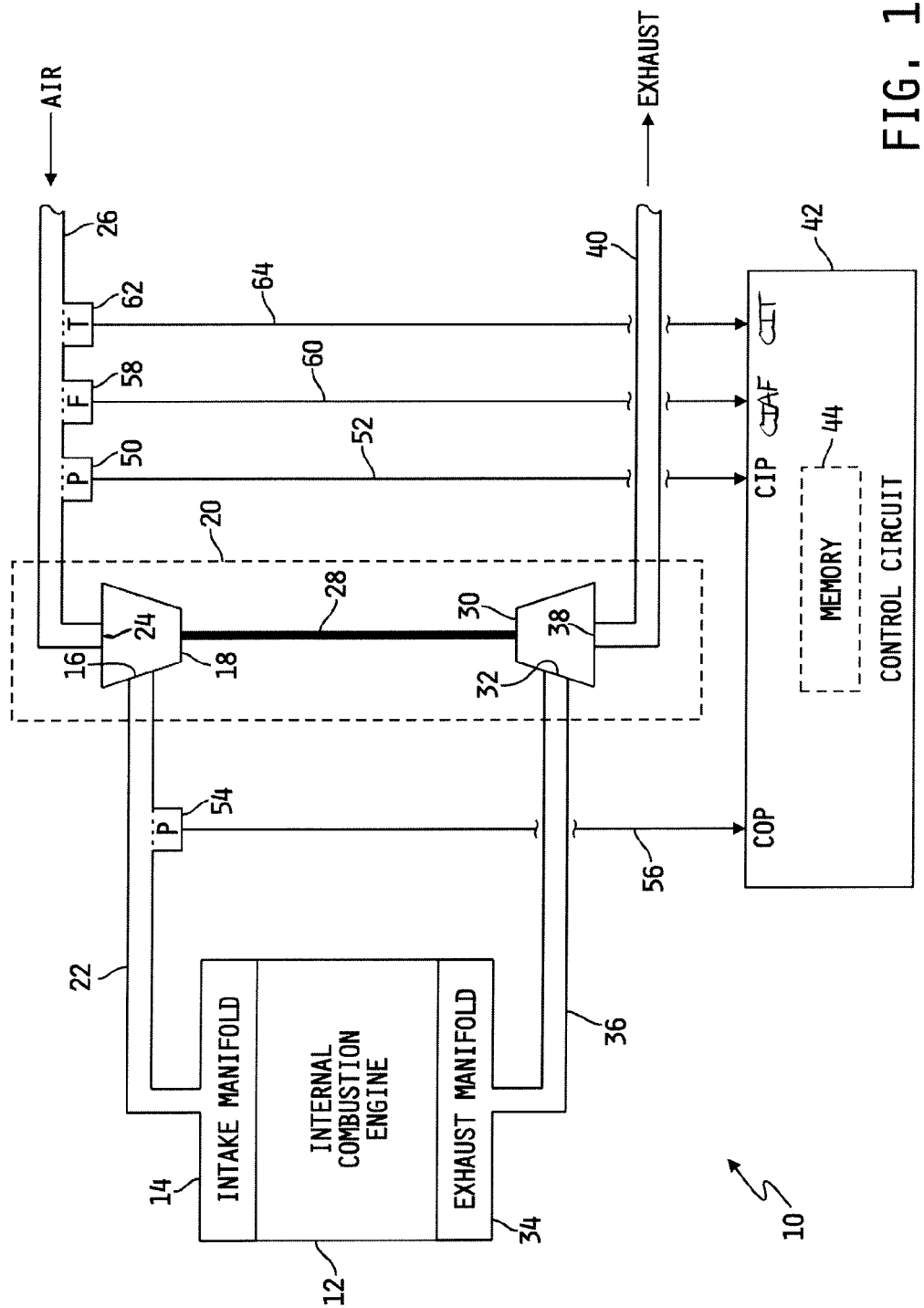
FIG. 1 is a block diagram of one illustrative embodiment of a system for estimating turbocharger operating speed.

Referring now to FIG. 1, a diagrammatic illustration is shown of one illustrative embodiment of a system 10 for estimating turbocharger operating speed. In the illustrated embodiment, the system 10 includes an internal combustion engine 12 having an intake manifold 14 that is fluidly coupled to an air 16 outlet of a compressor 18 of a conventional turbocharger 20 via an air intake conduit 22. The compressor 18 further includes an air inlet 24 coupled to an air intake conduit 26 for receiving fresh air. The turbocharger compressor 18 includes a rotatable wheel (not shown) that is mechanically coupled to one end of a rotatable drive shaft 28 having an opposite end that is mechanically coupled to a rotatable wheel (not shown) of a turbocharger turbine 30. The turbine 30 includes an exhaust inlet 32 that is fluidly coupled to an exhaust manifold 34 of engine 12 via an exhaust conduit 36. The turbine 30 further includes an exhaust outlet 38 that is fluidly coupled to ambient via an exhaust conduit 40.

The turbocharger 20 operates in a conventional manner in which exhaust gas produced by the engine 12 and exiting the exhaust manifold 34 is directed through the turbine 30 causing the turbine wheel to rotate. This rotary motion is translated by the drive shaft 28 to the compressor wheel. The compressor wheel is configured in a conventional manner such that rotation of the compressor wheel by the drive shaft 28 draws additional air through the air intake conduit 22 than would otherwise occur in the absence of the turbocharger 20. In the illustrated embodiment, the operating speed of the turbocharger 20 is thus the rotational speed of the combination of the turbine wheel, the drive shaft 28 and the compressor wheel, which is determined primarily by the flow rate of exhaust gas through the turbine 30.

The system 10 further includes a control circuit 42 that is generally operable to control and manage the overall operation of the engine 12. The control circuit 42 includes a memory unit 44 as well as a number of inputs and outputs for interfacing with various sensors and systems coupled to the engine 12. The control circuit 42 is illustratively microprocessor-based, although this disclosure contemplates other embodiments in which the control circuit 42 may alternatively be or include a general purpose or application specific control circuit capable of operation as will be described hereinafter. In any case, the control circuit 42 may be a known control unit sometimes referred to as an electronic or engine control module (ECM), electronic or engine control unit (ECU) or the like. Illustratively, the memory 44 of the control circuit 42 has stored therein one or more sets of instructions that are executable by the control circuit 42, as will be described in greater detail hereinafter, to estimate the operating speed of the turbocharger 20, e.g., the rotational speed of the compressor.

The control circuit 42 includes a number of inputs for receiving signals from various sensors or sensing systems associated with system 10. The control circuit 42 is generally operable in a conventional manner to sample the signals produced by the various sensors and/or sensing systems and to process the sampled signals to determine the associated operating conditions. For example, the system 10 includes a pressure sensor 50 that is disposed in fluid communication with the air intake conduit 26, e.g., at or near the air inlet of the compressor 18, and that is electrically connected to a compressor inlet pressure input, CIP, of the control circuit 42 via a signal path 52. The pressure sensor 50 may be of conventional, and is operable to produce a pressure signal on the signal path 52 that is indicative of air pressure at or near the air inlet 24 of the compressor 18.

The system 10 further includes another pressure sensor 54 that is disposed in fluid communication with air intake conduit 22, e.g., at or near the air outlet of the compressor 18, and that is electrically connected to a compressor outlet pressure input, COP, of the control circuit 42 via a signal path 56. The pressure sensor 54 may be of conventional, and is operable to produce a pressure signal on the signal path 56 that is indicative of air pressure at or near the air outlet 16 of the compressor 18.

The system 10 further includes a flow sensor 58 that is disposed in fluid communication with the air intake conduit 26, e.g., at or near the air inlet of the compressor 18, and that is electrically connected to a compressor inlet air flow input, CIAF, of the control circuit 42 via a signal path 60. The air flow sensor 58 may be of known construction, e.g., in the form of a conventional mass air flow sensor, and is operable to produce a flow signal on the signal path 60 that is indicative of a flow rate of air into the air inlet 24 of the compressor 18.

The system 10 further includes a temperature sensor 62 that is disposed in fluid communication with the air intake conduit 26, e.g., at or near the air inlet of the compressor 18, and that is electrically connected to a compressor inlet temperature input, CIT, of the control circuit 42 via a signal path 64. The temperature sensor 62 may be conventional, and is operable to produce a temperature signal on the signal path 60 that is indicative of the temperature at or near the air inlet 24 of the compressor 18.

The system 10 is illustrated in FIG. 1 and described as including physical sensors producing electrical signals that are indicative of compressor inlet pressure, compressor outlet pressure, compressor air inlet flow rate and compressor inlet temperature. It will be understood, however, that one or more of these parameters may be alternatively or additionally estimated by the control circuit 42 as a function of electrical signals produced by one or more other physical sensors, i.e., sensors other than those positioned and configured to produce signals that correspond to a direct measure of the subject parameter(s).

Figure 2:
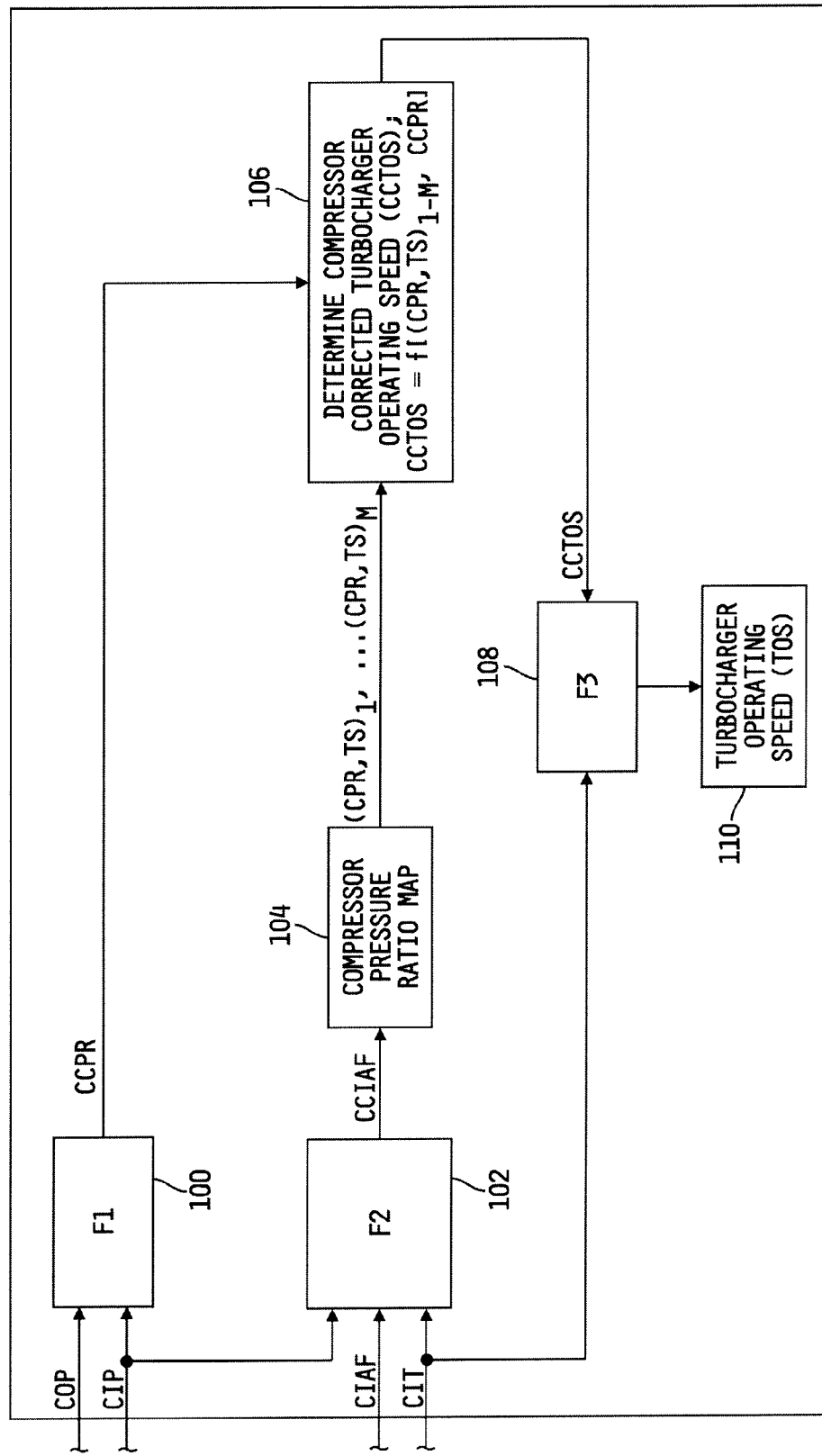
FIG. 2 is a block diagram of one illustrative embodiment of the control circuit of FIG. 1 configured to estimate turbocharger operating speed.

Referring now to FIG. 2, a block diagram is shown of one illustrative embodiment of the control circuit 42 of FIG. 1 configured to estimate the operating speed of the turbocharger 20. It will be understood that the various functional blocks illustrated in FIG. 2 represent individual instructions or instruction sets stored in the memory 44 and executable by the control circuit 42 to carry out the corresponding functions as will be described in greater detail hereinafter. Together, the functional blocks illustrated in FIG. 2 represent one illustrative embodiment of instructions that are stored in the memory unit 44 and executable by the control circuit 42 to estimate the operating speed of the turbocharger 20.

In the illustrated embodiment, the control circuit 42 includes a functional block 100 that receives as inputs the compressor inlet pressure and compressor outlet pressure signals, CIP and COP, produced on the signal paths 52 and 56 respectively. The functional block 100 processes CIP and COP according to a function F1 to produce a current compressor pressure ratio value, CCPR. In one illustrative embodiment, the function F1 is given by the equation CCPR=COP/CIP, although this disclosure contemplates other embodiments in which F1 includes more, fewer and/or different input parameters.

The control circuit 42 illustrated in FIG. 2 further includes another functional block 102 that receives as inputs the compressor inlet pressure signal, CIP, produced on the signal path 52, the compressor inlet air flow signal, CIAF, produced on the signal path 60 and the compressor inlet temperature signal, CIT, produced on the signal path 64. The functional block 102 processes CIP, CIAF and CIT according to a function F2 to produce a compressor-corrected inlet air flow signal, CCIAF, which represents the compressor inlet air flow value, CIAF, corrected for certain operating conditions, i.e., pressure and temperature, at the inlet 24 of the compressor 18. In one illustrative embodiment, for example, the function F2 is given by the equation CCIAF=CIAF*SQRT(CIT/$T_{STD}$)/(CIP/$P_{STD}$), where $T_{STD}$ is a standard reference temperature, e.g., 25° C. or other reference temperature, and $P_{STD}$ is a standard reference pressure, e.g., 101.3 kPa or other reference pressure. Alternatively, this disclosure contemplates other embodiments in which F2 includes more, fewer and/or different input parameters.

The compressor-corrected inlet air flow value, CCIAF, is provided as an input to another functional block 104 that has stored therein a conventional compressor pressure ratio map corresponding to the specific configuration of the turbocharger 20. Generally, the compressor pressure ratio map is configured to map CCIAF values to compressor pressure ratio values at a plurality of different turbocharger operating speeds. The functional block 104 is illustratively operable to process CCIAF using the compressor pressure ratio map to generate a number of pairs of compressor pressure ratio and turbocharger operating speed values.

Figure 3:
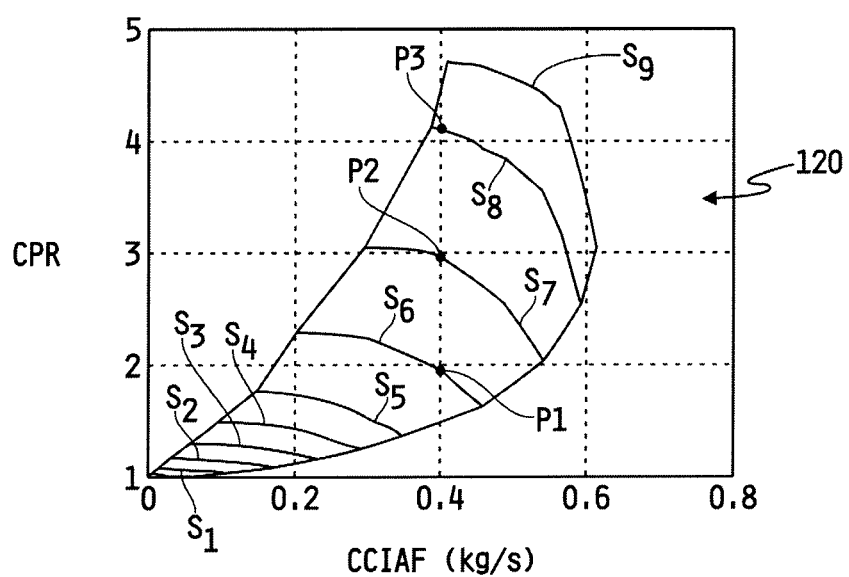
FIG. 3 is a turbocharger compressor pressure ratio map including a plot of turbocharger compressor ratio vs. compressor-corrected inlet air flow for a plurality of different turbocharger operating speed values.

Referring now to FIG. 3, an example of one such compressor pressure ratio map 120 is shown. In the illustrated embodiment, the compressor pressure ratio map 120 maps compressor-corrected inlet air flow values, CCIAF, to compressor pressure ratio values, CPR, at a plurality of different turbocharger operating speeds, where the contours $S_1$-$S_9$ represent lines of different, constant turbocharger operating speeds. With the map 120, any one value of CCIAF thus produces a number, M, of different compressor pressure ratio, CPR, and turbocharger operating speed, TS, pairs (CPR, TS)$_1$, . . . , (CPR, TS)$_M$, where M may be any positive integer. As one specific example, if CCIAF=0.4 kg/s, the following three compressor pressure ratio and turbocharger operating speed value pairs, P1, P2 and P3, are generated: (1.95, $S_6$), (3.0, $S_7$) and (4.1, $S_9$). The functional block 104 illustrated in FIG. 2 thus processes the CCIAF values using the compressor pressure ratio map stored in the memory 44 to generate a number, M, of pairs of compressor pressure ratio and turbocharger operating speed values, (CPR, TS)$_{1-M}$.

The current compressor pressure ratio, CCPR, produced by the functional block 100 and the number of pairs of compressor pressure ratio and turbocharger operating speed values, (CPR, TS)$_{1-M}$, produced by the functional block 104 are provided as inputs to another functional block 106. The functional block 106 processes a function of at least two of the (CPR, TS)$_{1-M}$ pair values and the CCPR value to produce a compressor-corrected turbocharger operating speed estimate, CCTOS. In one embodiment, for example, two of the (CPR, TS)$_{1-M}$ pair values are selected with one pair having a CPR value that is less than CCPR and the other pair having a CPR value that is greater than CCPR, and a conventional interpolation technique is used to determine a CCTOS value that corresponds to CCPR. In embodiments in which the function of the two (CPR, TS)$_{1-M}$ pair values is linear, or can be acceptably approximated by a linear function, a conventional linear interpolation technique may be used to determine CCTOS. Alternatively, in embodiments in which the function of the two (CPR, TS)$_{1-M}$ pair values is non-linear, a conventional non-linear interpolation technique may be used to determine CCTOS.

In another example embodiment, the functional block 106 may be configured to process the number of (CPR, TS)$_{1-M}$ pair values to generate a continuous or piece-wise continuous profile of compressor-corrected turbocharger operating speeds as a function of compressor pressure ratios. The profile may illustratively be linear or non-linear. In this embodiment, the functional block 106 is then operable to map CCPR to CCTOS using the generated profile. It will be appreciated that one or more other conventional processing techniques may alternatively be used to process the number of (CPR, TS)$_{1-M}$ pair values and CCPR to determine CCTOS, and any such alternate processing techniques are contemplated by this disclosure.

The control circuit 42 illustrated in FIG. 2 further includes another functional block 108 that receives as inputs the compressor inlet temperature signal, CIT, produced on the signal path 64 and the compressor-corrected turbocharger operating speed estimate produced by the functional block 106. The functional block 108 processes CIT and CCTOS according to a function F3 to produce an estimate of the actual turbocharger operating speed, TOS. In one illustrative embodiment, for example, the function F3 is given by the equation TOS=CCTOS*SQRT(CIT/$T_{STD}$), where $T_{STD}$ is as described herein above. The turbocharger operating speed estimate, TOS, is stored in a memory block 110 for use by one or more control algorithms executed by the control circuit 42 and/or external control circuit or system.

The algorithm illustrated in FIG. 2 is continually executed by the control circuit 42 to thereby continually estimate the operating speed of the turbocharger 20 under steady state and transient operating conditions.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A system for estimating an operating speed of a turbocharger, the system comprising:
   the turbocharger including a compressor having an inlet and an outlet;
   a first pressure sensor configured to produce a first pressure value indicative of gas pressure at or near the inlet of the compressor;
   a second pressure sensor configured to produce a second pressure value indicative of gas pressure at or near the outlet of the compressor;
   a temperature sensor configured to produce a temperature value indicative of gas temperature at or near the inlet of the compressor;
   a flow sensor configured to produce a flow value indicative of a flow rate of gas into the inlet of the compressor; and
   a control circuit configured to estimate the operating speed of the turbocharger in response to the first and second pressure values, the temperature value and the flow value for use in the system.

2. The system of claim 1 wherein the control circuit is configured to process the flow value using a map of compressor pressure ratio values that maps inlet flow rate values at a plurality of different turbocharger operating speeds to generate a number of pairs of turbocharger operating speed and compressor pressure ratio values.

3. The system of claim 2 wherein the control circuit is configured to determine a compressor-corrected flow rate value in response to the flow value, the temperature value and the first pressure value, and
   wherein the map is configured to map the compressor-corrected flow rate values to the compressor pressure ratio values at the plurality of different turbocharger operating speeds.

4. The system of claim 3 wherein the control circuit is configured to determine a current compressor pressure ratio value in response to the first and second pressure values, and to process the current compressor pressure ratio value along with at least one of the number of pairs of turbocharger operating speed and compressor pressure ratio values to estimate the operating speed of the turbocharger.

5. The system of claim 4 wherein the estimated operating speed of the turbocharger represents a compressor-corrected operating speed of the turbocharger, and
   wherein the control circuit is configured to estimate the operating speed of the turbocharger in response to the compressor-corrected operating speed of the turbocharger and the temperature value.

6. The system of claim 1 wherein the control circuit is configured to determine a current compressor pressure ratio in response to the first and second pressure values, to process the flow value using a compressor pressure ratio map to generate a number of pairs of turbocharger operating speed and compressor pressure ratio values, and to estimate the operating speed of the turbocharger using the current compressor pressure ratio value and at least one of the number of pairs of turbocharger operating speed and compressor pressure ratio values.

7. The system of claim 6 wherein the estimated operating speed of the turbocharger represents a compressor-corrected turbocharger operating speed, and
wherein the control circuit is configured to estimate the operating speed of the turbocharger in response to the compressor-corrected turbocharger operating speed and the temperature value.

8. The system of claim 1 wherein the control circuit is configured to control operation of an internal combustion engine operatively coupled to the turbocharger.

9. A system for estimating an operating speed of a turbocharger, the system comprising:
the turbocharger including a compressor having an inlet and an outlet;
a first pressure sensor configured to produce a first pressure value indicative of gas pressure at or near the inlet of the compressor;
a second pressure sensor configured to produce a second pressure value indicative of gas pressure at or near the outlet of the compressor;
a flow sensor configured to produce a flow value indicative of a flow rate of gas into the inlet of the compressor; and
a control circuit configured to process the flow value using a compressor pressure ratio map to generate a number of pairs of turbocharger operating speed and compressor pressure ratio values, to determine a current compressor pressure ratio value in response to the first and second pressure values, and to estimate the operating speed of the turbocharger using the current compressor pressure ratio value and at least one of the number of pairs of the turbocharger operating speed and compressor pressure ratio values for use in the system.

10. The system of claim 9 further comprising a temperature sensor configured to produce a temperature value indicative of gas temperature at or near the inlet of the compressor,
wherein the control circuit is configured to determine a compressor-corrected flow value in response to the flow value, the first pressure value and the temperature value, and
wherein the control circuit is configured to process the compressor-corrected flow value using the compressor pressure ratio map to generate the number of pairs of turbocharger operating speed and compressor pressure ratio values.

11. The system of claim 10 wherein the compressor pressure ratio map is configured to map inlet flow rate values to compressor pressure ratio values at a plurality of different turbocharger operating speeds, and
wherein the control circuit is configured to generate the number of pairs of turbocharger operating speed and compressor pressure ratio values by processing the compressor-corrected flow value using the compressor pressure ratio map.

12. The system of claim 9 further comprising a temperature sensor configured to produce a temperature value indicative of temperature at or near the inlet of the compressor,
wherein the estimated operating speed of the turbocharger represents a compressor-corrected turbocharger operating speed, and
wherein the control circuit is configured to estimate the turbocharger operating speed in response to the compressor-corrected turbocharger operating speed and the temperature value.

13. The system of claim 9 wherein the compressor pressure ratio map is configured to map inlet flow rate values to compressor pressure ratio values at a plurality of different turbocharger operating speeds, and
wherein the control circuit is configured to generate the number of pairs of turbocharger operating speed and compressor pressure ratio values by processing the flow value using the compressor pressure ratio map.

14. The system of claim 9 wherein the control circuit is configured to control operation of an internal combustion engine operatively coupled to the turbocharger.

15. A system for estimating an operating speed of a turbocharger, the system comprising:
the turbocharger including a compressor having an inlet and an outlet;
a control circuit, comprising:
a processor operable to estimate the operating speed of the turbocharger in response to a pressure of gas entering the inlet of the compressor, a pressure of gas exiting the outlet of the compressor, a temperature of gas entering the inlet of the compressor, and a flow rate of gas into the inlet of the compressor, for use in the system; and
a plurality of outputs configured to control operation of an internal combustion engine operatively coupled to the turbocharger in response to the estimated operating speed of the turbocharger.

16. The system of claim 15 wherein the processor is configured to process the flow rate of gas into the inlet of the compressor using a map comprising compressor pressure ratio values based on inlet flow rate values at a plurality of different turbocharger operating speeds to generate at least one pair of turbocharger operating speed and compressor pressure ratio values.

17. The system of claim 16 wherein the processor is configured to determine a compressor-corrected flow rate value in response to the flow rate of gas into the inlet of the compressor, the temperature of gas entering the inlet of the compressor, and the pressure of gas entering the inlet of the compressor, and wherein the map comprises compressor pressure ratio values based on compressor-corrected flow rate values at the plurality of different turbocharger operating speeds.

18. The system of claim 17 wherein the processor is configured to determine a current compressor pressure ratio value in response to the pressure of gas entering the inlet of the compressor and the pressure of gas exiting the outlet of the compressor, and to process the current compressor pressure ratio value using the at least one pair of turbocharger operating speed and compressor pressure ratio values to estimate the operating speed of the turbocharger.

19. The system of claim 18 wherein the estimated operating speed of the turbocharger represents a compressor-corrected operating speed of the turbocharger, and wherein the processor is configured to estimate the operating speed of the turbocharger using the compressor-corrected operating speed of the turbocharger and the temperature of gas entering the inlet of the compressor.

20. The system of claim 15 wherein the processor is configured to determine a current compressor pressure ratio in response to the pressure of gas entering the inlet of the compressor and the pressure of gas exiting the outlet of the compressor, to process the flow rate of gas into the inlet of the compressor using a compressor pressure ratio map to generate at least one pair of turbocharger operating speed and compressor pressure ratio values, and to estimate the operating speed of the turbocharger using the current compressor pressure ratio value and the at least one pair of turbocharger operating speed and compressor pressure ratio values.

* * * * *